US008986232B2

(12) United States Patent
Saglia et al.

(10) Patent No.: US 8,986,232 B2
(45) Date of Patent: Mar. 24, 2015

(54) LINEAR ACTUATOR AND REHABILITATION DEVICE INCORPORATING SUCH AN ACTUATOR

(75) Inventors: Jody A. Saglia, Ivera (IT); Nikos G. Tsagarakis, Genoa (IT); Jian S. Dai, Sutton (GB); Darwin G. Caldwell, Serra Ricco' (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 870 days.

(21) Appl. No.: 13/145,517

(22) PCT Filed: Jan. 25, 2010

(86) PCT No.: PCT/IB2010/050310
§ 371 (c)(1),
(2), (4) Date: Jul. 20, 2011

(87) PCT Pub. No.: WO2010/092497
PCT Pub. Date: Aug. 19, 2010

(65) Prior Publication Data
US 2011/0306473 A1 Dec. 15, 2011

(30) Foreign Application Priority Data
Jan. 23, 2009 (IT) .............................. TO2009A0042

(51) Int. Cl.
*A61H 1/00* (2006.01)
*F16H 19/06* (2006.01)
*A61H 1/02* (2006.01)

(52) U.S. Cl.
CPC .......... *F16H 19/0618* (2013.01); *A61H 1/0266* (2013.01); *A61H 2201/5061* (2013.01); *A61H 2201/5064* (2013.01)
USPC ................ 601/27; 601/23; 601/33; 601/100; 601/104; 482/79; 74/89.22

(58) Field of Classification Search
USPC ............ 601/5, 24, 23, 26, 28, 29, 33, 34, 35, 601/84, 89, 90, 92, 93, 97, 98, 100, 101, 601/104; 482/79; 602/5, 16; 74/84 R, 89.2, 74/89.21, 89.22, 112
See application file for complete search history.

(56) References Cited

U.S. PATENT DOCUMENTS 3,500,692 A * 3/1970 Parker et al. ................. 74/89.22
4,774,611 A * 9/1988 Ando ............................ 74/89.2
(Continued)

FOREIGN PATENT DOCUMENTS

EP 0 060 341 A 9/1982
EP 1 944 527 A 7/2008

*Primary Examiner* — Quang D Thanh
(74) *Attorney, Agent, or Firm* — Merchant & Gould P.C.

(57) ABSTRACT

An actuator (10) includes a body (12), an output member (14) slidably received in the body (12) along— a first axis (X1), an electric motor (18) arranged to set into rotation a motor shaft (20) about a, second axis (X2) and a motion conversion mechanism (22) for converting the rotary motion produced by the electric motor (18) about the second axis (X2) into a translational motion of the output member (14) along the first axis (X1). The motion conversion mechanism (22) includes a driving pulley (24) which is drivingly connected for rotation with the motor shaft (20) and an elongated mechanical transmission member which is wound onto the driving pulley (24) and is fastened at its two opposite ends to the output member (14) to draw this latter in either direction along the first axis (X1) as a result of the rotation of the driving pulley (24) in either direction. The output member (14) is shaped as a rod and is received in a cylindrical cavity (16) of the body (12) so as to project partially therefrom. The elongated mechanical transmission member (2S) is fastened to the output member (14) at axially opposite points of this latter with respect to the driving pulley (24).

10 Claims, 4 Drawing Sheets

(56) References Cited

U.S. PATENT DOCUMENTS

| | | | | |
|---|---|---|---|---|
| 6,878,102 | B1 | 4/2005 | Commisso | |
| 8,523,790 | B2 * | 9/2013 | Matsuoka et al. | 601/5 |
| 8,544,853 | B2 * | 10/2013 | Kanaoka | 280/1.181 |
| 2008/0000317 | A1 * | 1/2008 | Patton et al. | 74/500.5 |

* cited by examiner

LINEAR ACTUATOR AND REHABILITATION DEVICE INCORPORATING SUCH AN ACTUATOR

This application is a National Stage Application of PCT/IB2010/050310, filed 25 Jan. 2010, which claims benefit of Serial No. TO2009A000042, filed 23 Jan. 2009in Italy and which applications are incorporated herein by reference. To the extent appropriate, a claim of priority is made to each of the above disclosed applications.

BACKGROUND OF THE INVENTION

The present invention refers to a linear actuator, and more in particular to an electro-mechanical linear actuator basically comprising a body, an output member slidably received in the body along an axial direction, an electric motor (or gear motor) and a motion conversion mechanism for converting the rotary motion produced by the electric motor into a translational motion of the output member along the aforesaid axial direction, wherein the motion conversion mechanism includes a driving pulley set into rotation by the electric motor and a cable, or similar elongated mechanical transmission member, which is wound onto the driving pulley and is fastened at its two opposite ends to the output member to draw this latter in either way along the aforesaid axial direction as a result of the rotation of the driving pulley in either direction of rotation.

A linear actuator of the above-identified type is known from European patent application EP1944527. According to this known solution, the two cable lengths leave the driving pulley in a substantially transverse direction relative to the axial direction (direction of the sliding movement of the output member) and are deviated by respective guide pulleys so as to run parallel to the aforesaid axial direction in the same way. One of the two cable lengths is wound onto a third guide pulley, which is located at the axially opposite side of the output member to the driving pulley, to be fastened to the output member itself near the fastening point of the other cable length. The presence of the third guide pulley prevents the output member from being made as a rod which is slidably received in a cylindrical cavity and which partially projects from that cavity. A possible rod should be fastened, on the other hand, to the output member so as to extend alongside the two cable lengths which run among the three guide pulleys and not to be therefore hindered by the third guide pulley. In this way, however, problems of guiding of the rod might arise, since the traction forces alternatively applied by the two cable lengths would not be aligned with the sliding direction of the rod.

SUMMARY OF THE INVENTION

It is therefore an object of the invention to provide a linear actuator of the above-identified type, wherein the output member is shaped as a rod and is slidably received in a cylindrical cavity of the body so as to partially project from that cavity, thereby allowing the use of the linear actuator in all those applications which require the actuator to be made as a cylinder and rod assembly. Another object of the invention is to provide a linear actuator of the above-identified type, which is able at the same time to apply high axial forces (i.e. forces acting in the same direction as the sliding movement of the rod) on the rod and to move the rod at a high speed. A further object of the invention is to provide a linear actuator of the above-identified type, which is reversible (or back-driveable), i.e. which is able not only to cause the rod to shift axially in either way, but also to be subject to axial displacements of the rod in either way as a result of the application of an external load on the rod itself.

In short, the invention is based on the idea of providing a linear actuator of the above-identified type, in which the output member is shaped as a rod and is slidably received in a cylindrical cavity of the body so as to partially project therefrom, and in which the cable of the motion conversion mechanism is fastened at its two opposite ends to the output member at axially opposite points of this latter relative to the driving pulley. The cable of the motion conversion mechanism is thus able to produce traction forces on the output member in either way without the need of a guide pulley located on the axially opposite side of the output member to the driving pulley.

According to a preferred embodiment of the invention, the axis of rotation of the driving pulley is oriented parallel to the axial direction, i.e. to the direction of the sliding movement of the output member, so as to reduce the overall size of the actuator in the transverse direction, i.e. in a direction perpendicular to the aforesaid axial direction. In this case, the motion conversion mechanism further includes a pair of guide pulleys each associated to a respective flexible cable length to deviate the direction of this latter from transverse to axial. Alternatively, the axis of rotation of the driving pulley may be oriented perpendicular to the axial direction. This allows to avoid the use of the two guide pulleys, but results in an increase in the transverse overall size of the actuator.

BRIEF DESCRIPTION OF THE DRAWINGS

Further characteristics and advantages of the present invention will appear from the following detailed description, given purely by way of non-limiting example with reference to the appended drawings, in which.

Figure 1:
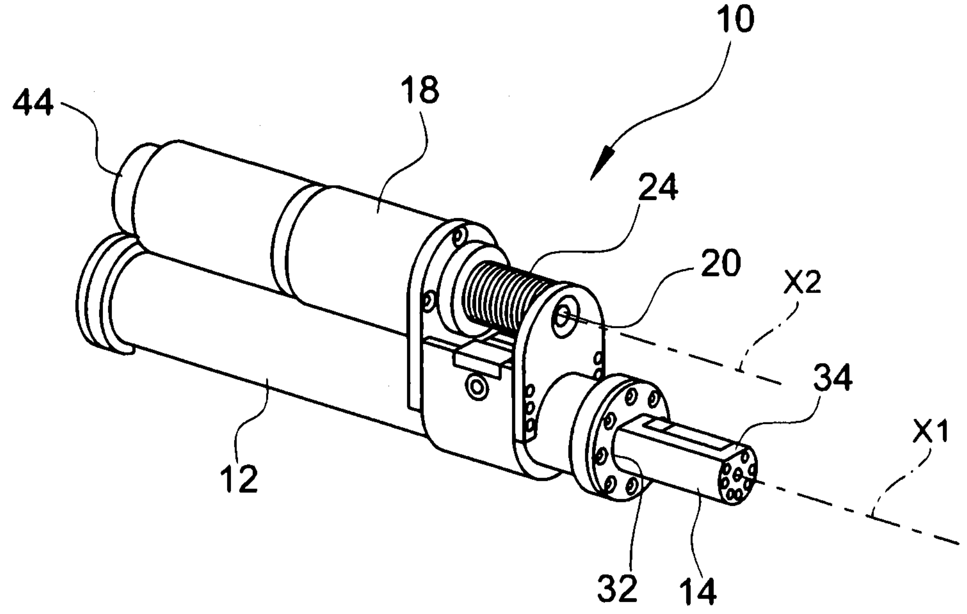
FIG. 1 is a perspective view of a linear actuator according to a preferred embodiment of the present invention.

In the following description and claims, the term "axial" is used to indicate the direction of the translational movement of the output member of the linear actuator or, in a broader sense, a direction parallel thereto, while the term "transverse" is used to indicate a direction laying in a plane perpendicular to the aforesaid axial direction.

DETAILED DESCRIPTION OF THE PREFERRED EMBODIMENTS

With reference first to FIGS. 1 to 6, a linear actuator according to a preferred embodiment of the present invention is generally indicated 10 and comprises:

- a hollow body 12, preferably having a generally cylindrical shape;
- an output member 14 in the shape of a rod which is received in a cylindrical cavity 16 of the body 12 so as to be able to slide in the direction of the axis of that cavity (indicated X1), which direction will be hereinafter referred to as axial direction;
- an electric motor 18, preferably coupled to a reduction gear, which motor is mounted on the body 12 and has a motor shaft 20 arranged with its own axis (indicated X2) parallel to the axis X1 of the cavity 16; and
- a motion conversion mechanism 22 interposed between the motor shaft 20 of the electric motor 18 and the rod 14 to convert the rotary motion, in either direction, of the first one about its own axis X2 in a translational motion, in either direction, of the second one along its own axis X1.

Figure 2:
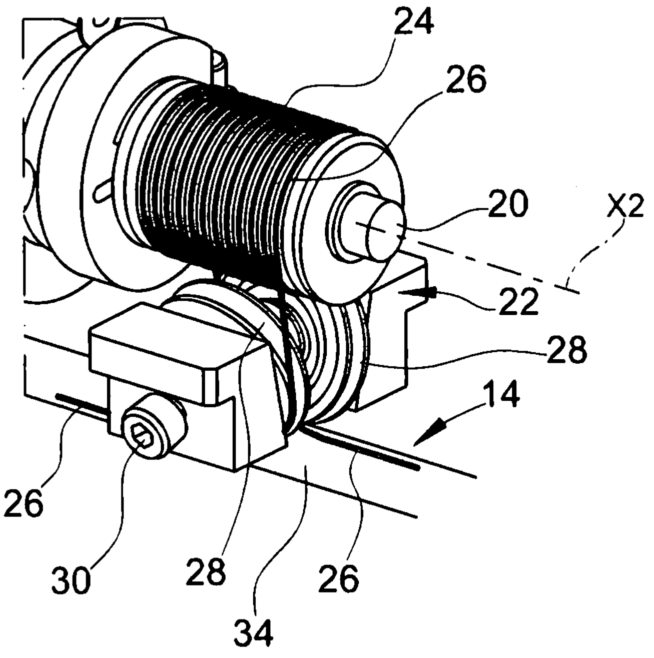
FIG. 2 is a perspective view which shows in detail the motion conversion mechanism of the linear actuator of FIG. 1.

As can be better seen in the detailed view of FIG. 2, the motion conversion mechanism 22 comprises a driving pulley 24 fitted to the motor shaft 20 to be set into rotation by it, and a cable 26 which is accommodated in a helical groove provided on the lateral surface of the driving pulley 24 and has its two opposite ends fastened to the rod 14 at axially opposite points of this latter relative to the driving pulley 24. The cable 26 is advantageously a multi-strand steel cable, so as to be able to transmit high traction forces. According to this embodiment, in which the driving pulley 24 is arranged with its own axis X2 parallel to the axis X1 of the rod 14, the motion conversion mechanism 22 further comprises a pair of guide pulleys 28 interposed between the driving pulley 24 and the rod 14 and associated each to a respective length of the cable 26 to deviate the direction of this latter from transverse to axial. The two cable lengths leaving the driving pulley 24 have therefore respective first portions extending transversely in the same direction and, downstream of the guide pulleys 28, respective second portions extending axially in opposite directions.

The two guide pulleys 28 are idly mounted on respective pins 30 carried by a support structure 32 fixed to the body 12. As can be better seen in the section view of FIG. 5, the axes of the two guide pulleys 28 are not aligned, but are advantageously inclined to each other, in such a manner that the two guide pulleys 28 are arranged in the shape of a V converging towards the rod 14. The distance between the axes of the motor shaft 20 and of the rod 14, and hence the transverse overall size of the linear actuator 10, is thus further reduced.

Figure 4:
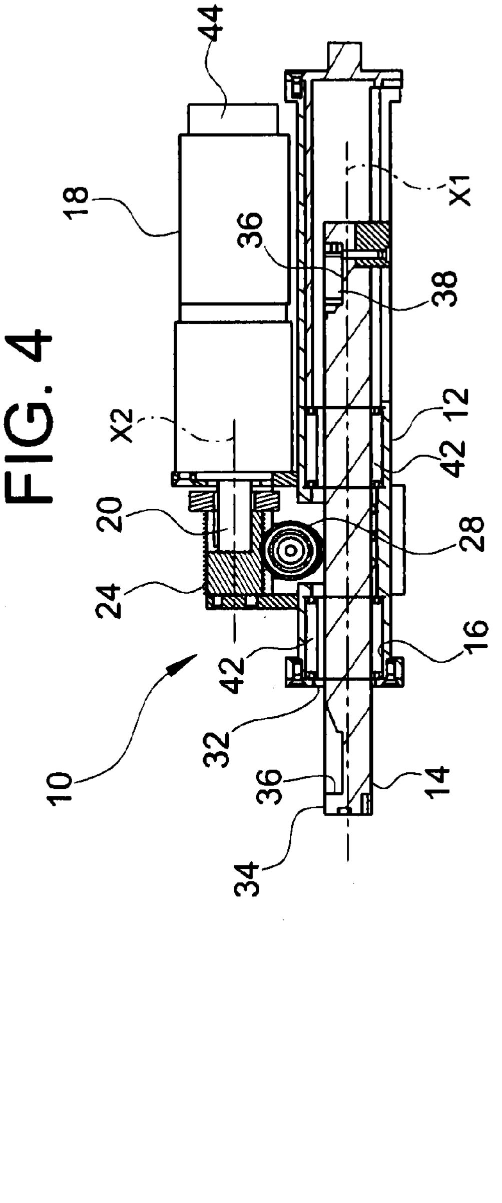
FIG. 4 is a section view of the linear actuator taken along line IV-IV of FIG. 3.
Figure 3:
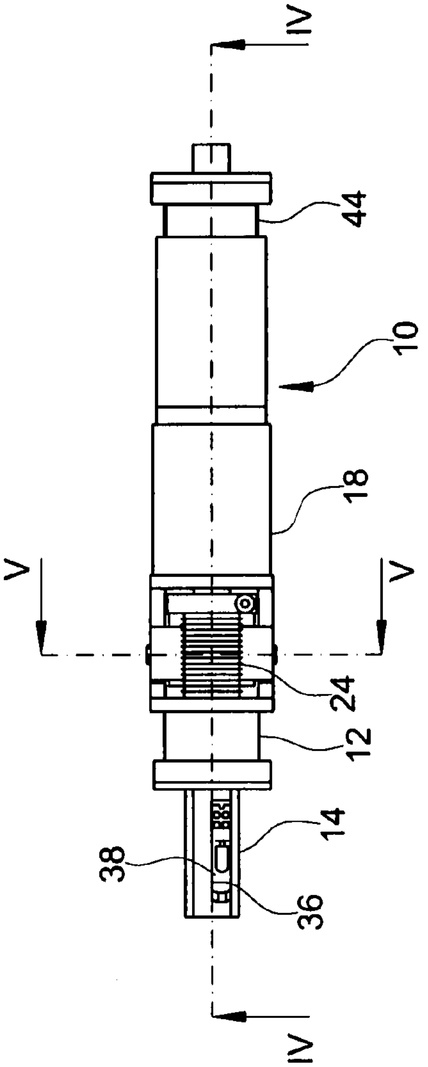
FIG. 3 is a view from above of the linear actuator of FIG. 1.
Figure 5:
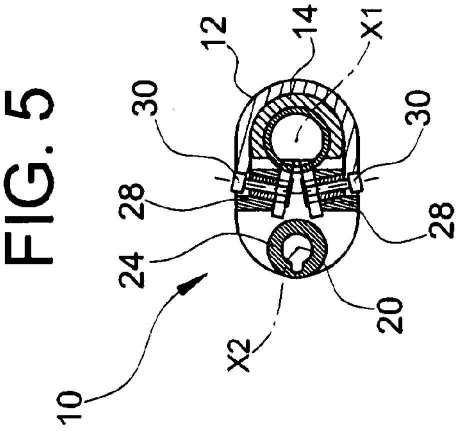
FIG. 5 is a section view of the linear actuator taken along line V-V of FIG. 3.
Figure 6:
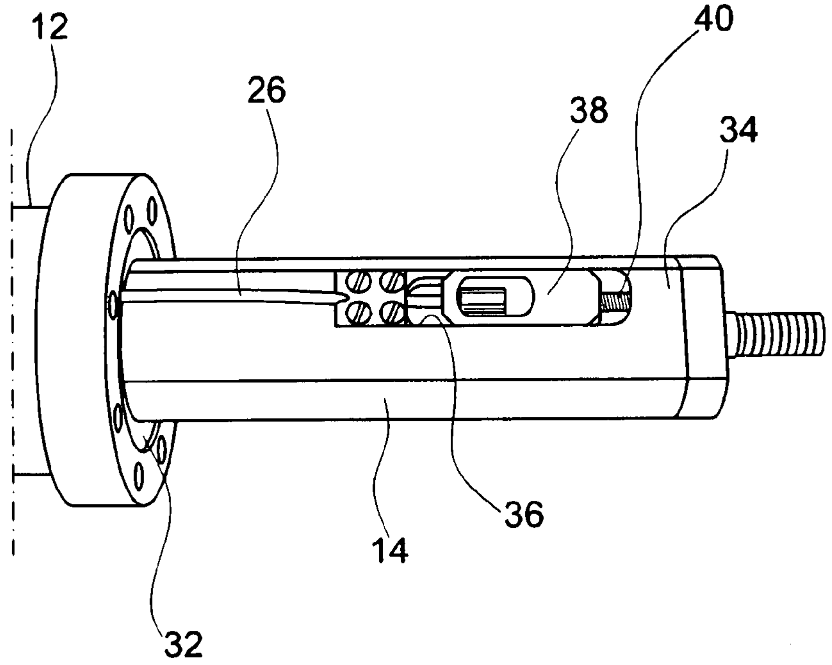
FIG. 6 is a perspective view which shows in detail an axial end portion of the output member of the linear actuator of FIG. 1.

As is evident in particular from the section view of FIG. 4, the rod 14 projects partially from an opening 32 of the cavity 16 of the body 12, preferably axially facing towards the side of the driving pulley 24. The rod 14 is a generally cylindrical piece, preferably with a solid cross-section, on whose side facing the driving pulley 24 a flat surface 34 with anti-rotation function is provided and extends throughout the rod. At the opposite ends of the rod 14, in the area of the flat surface 34, respective notches 36 are provided and accommodate respective end members 38 for fastening the two ends of the cable 26 to the rod. One of the two end members 38, in particular the one mounted at the end of the rod 14 projecting from the body 12, can been seen in FIG. 6. As can be noted from that figure, according to a preferred embodiment of the invention the end member 38 is axially slidably mounted in the associated notch 36 in such a manner that its axial position can be adjusted, and hence possible plays can be taken up, by means of an adjusting screw 40. A pair of linear bearings 42 (FIG. 4) are provided to guide the rod 14 and to bear the transverse loads resulting from the fact that the lengths of the cable 26 which run along the rod are not perfectly aligned with the axis X1 of this latter, but slightly spaced therefrom.

The linear actuator 10 further includes a position sensor 44 able to provide a signal indicative of the linear position of the rod 14. In the illustrated embodiment, the position sensor 44 is an incremental encoder, but can obviously be a sensor of a different type. Preferably, the linear actuator 10 further includes a load cell placed at the end of the rod 14 projecting from the body 12 to provide a signal indicative of the axial force produced by the actuator.

The operation of the linear actuator 10 according to the invention will be obvious in the light of the above description of its structure. It suffices therefore to state that upon rotation of the driving pulley 24 in either direction under control of the electric motor 18, each time one of the two free lengths of the cable 26 is wound onto the driving pulley 24 and therefore draws with it the associated end portion of the rod 14, thereby causing the extraction of the rod (when the cable length associated to the end of the rod which is housed within the cavity 16 of the body 12 is wound onto driving pulley 24) or, respectively, the retraction of the rod (when the cable length associated to the end of the rod which is outside the body 12 is wound onto the driving pulley 24).

The number of coils formed by the cable 26 on the driving pulley 24 can be freely chosen, taking into account that the higher is the number of coils, the lower is the tendency of the cable to slip onto the pulley, i.e. the higher is the "stiffness" of the actuator. The maximum travel of the linear actuator 10 can be increased or reduced by increasing or reducing, respectively, the diameter of the driving pulley 24.

Figure 7:
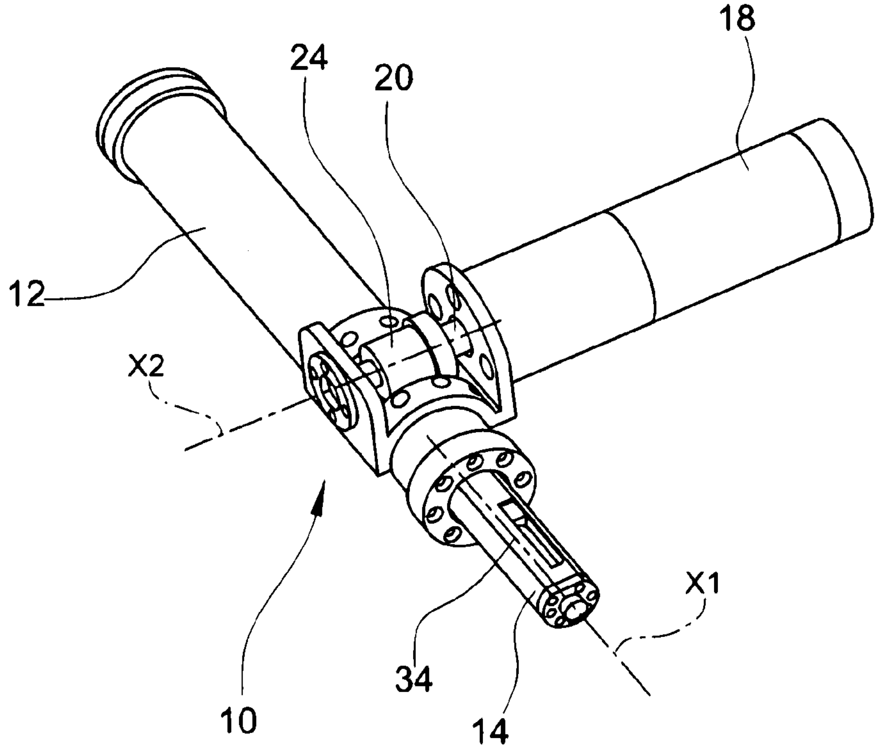
FIG. 7 is a perspective view of a linear actuator according to a variant embodiment of the present invention.

A variant of embodiment of the linear actuator according to the present invention is illustrated in FIG. 7, where parts and elements identical or corresponding to those of the preceding figures have been given the same reference numerals. According to that variant, the motor shaft 20 of the electric motor 18 and the driving pulley 24 are arranged with their own axis X2 oriented perpendicular to the axis X1 of the rod 14. Such an arrangement clearly allows to omit the guide pulleys, since the free lengths of the cable leave the driving pulley 24 being already oriented parallel to the axial direction, but inevitably results in larger transverse overall size of the linear actuator.

A possible example of application of a linear actuator according to the present invention is the field of robotic rehabilitation systems.

Nowadays, robotic systems are more and more frequently used in the field of physical rehabilitation, since they allow, in combination with virtual reality environments, to establish, both qualitatively and above all quantitatively, the level of recovery from injuries, thereby improving the current rehabilitation protocols and contributing to define more efficient protocols. More specifically, the robotic rehabilitation systems allow patients to carry out intensely and fully autonomously a wide range of exercises, providing the physiotherapists with instruments for treating the patients with the minimum level of supervision and hence with the maximum efficiency.

In particular, a further object of the present invention is to provide a rehabilitation device with a two-degree-of-freedom parallel kinematics for the treatment of ankle injuries which has the advantage of a greater simplicity both in mechanical and in kinematical terms than the current rehabilitation devices with parallel kinematics with more degrees of freedom and which at the same time is fully able to allow to carry out all the exercises required by the rehabilitation protocols for the treatment of ankle injuries.

Figure 8:
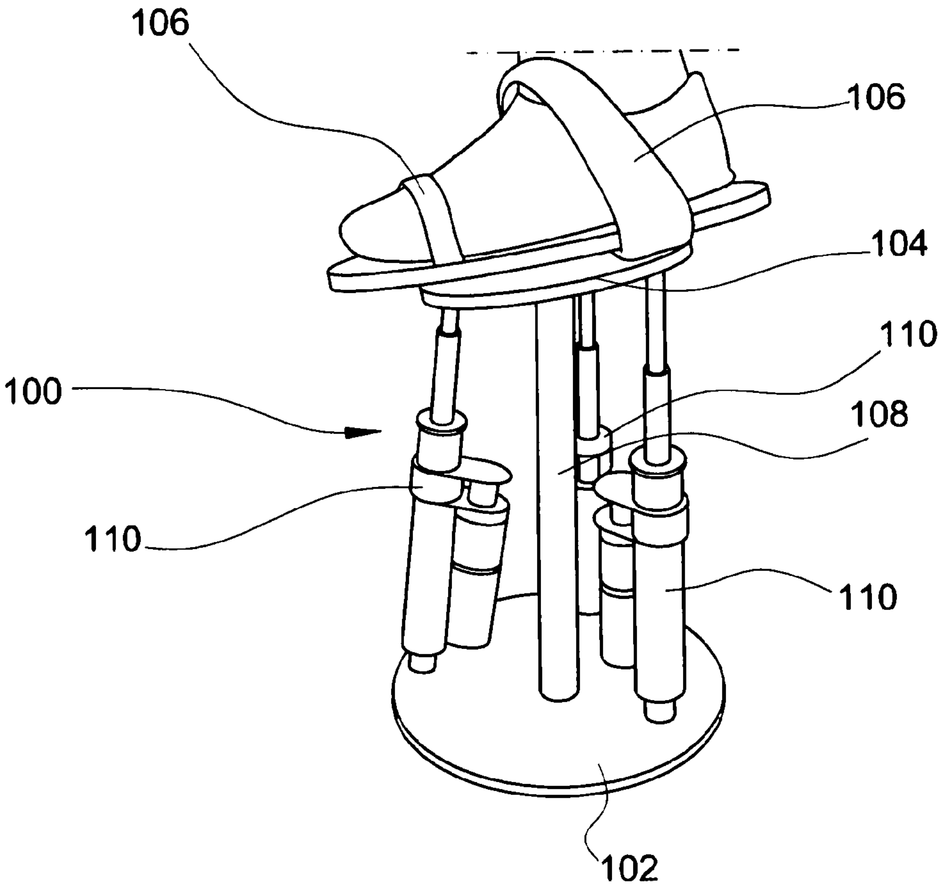
FIG. 8 is a perspective view of a rehabilitation device, in particular of a rehabilitation device for the treatment of ankle injuries, incorporating three linear actuators of the same type as the one illustrated in FIGS. 1 to 6.

With reference to FIG. 8, a rehabilitation device according to the present invention is generally indicated 100 and basically comprises:

a support base 102;

a movable platform 104 on which the foot of the patient can be fastened by means of fastening belts 106 with Velcro straps;

a central strut 108 which is fixed at its bottom end to the support base 102 and is connected at its top end to the movable platform 104 by means of a universal joint; and three "active" legs each comprising a linear actuator 110 of the same type as the one described above with reference to FIGS. 1 to 6, the linear actuator 110 having a body 112 which is connected at its bottom by means of a universal joint to the support base 102 and a rod 114 which is connected at its top to the movable platform 104 by means of a ball joint, in such a manner that the connection points of the actuators 110 to the support base 102 are equally spaced along a first circumference and the connection pints of the actuators 110 to the movable platform 104 are equally spaced along a second circumference which in the illustrated example has a smaller diameter than that of the first circumference.

As a result of the connection to the central strut 108 by means of a universal joint, the movable platform 104 has two rotational degrees of freedom corresponding to the two main movements of the ankle, that is to say, the dorsi/plantar flexion movements and the inversion/eversion movements. The use of three linear actuators 110 for controlling the orientation of the two-degree-of-freedom movable platform 104 renders therefore the rehabilitation device over-actuated, i.e. redundantly actuated, with the advantage that the device is able to operate also in case of damages to one of the three linear actuators.

Figure 9:
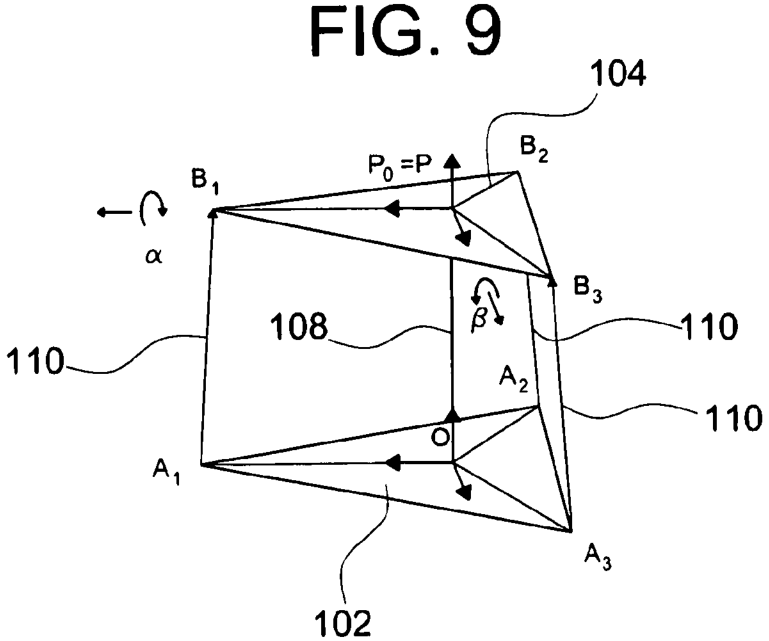
FIG. 9 is a schematic diagram showing the geometry of the rehabilitation device of FIG. 8.

FIG. 9 shows the geometry of the rehabilitation device of FIG. 8. $A_1$, $A_2$ and $A_3$ indicate the connection points (by means of universal joints) of the three linear actuators 110 to the support base 102, respectively, while $B_1$, $B_2$ and $B_3$ indicate the connection points (by means of ball joints) of the three linear actuators 110 to the movable platform 104, respectively. The centre of the support base 102, i.e. the centre of the circumference on which the points $A_1$, $A_2$ and $A_3$ are equally spaced, is indicated O, while the centre of the movable platform 104, i.e. the centre of the circumference on which the points $B_1$, $B_2$ and $B_3$ are equally spaced, is indicated P. The point O corresponds to the fixing point of the central strut 108 to the support base 102. The centre P of the movable platform 104 coincides with a connection point $P_0$ (by means of a universal joint) of the central strut 108 to the movable platform 104. The two rotational degrees of freedom of the movable platform 104 are indicated α and β, respectively.

The main geometrical parameters of the rehabilitation device are the height of the movable platform 104, which is to the distance between the points O and P (i.e. $P_0$), the radius of the support base 102, that is to say, the radius of the circumference along which the connection points (universal joints) of the legs to the base itself are located, the radius of the movable platform 104, that is to say, the radius of the circumference along which the connection points (ball joints) of the legs to the platform itself are located, and the travel of the linear actuators 110. Obviously, the greater is the radius of the movable platform 104, the greater is the torque generated by the device and the less is the working space. On the other hand, the greater is the height of the device, the greater must be the travel of the linear actuators 110 to obtain a given field of movement and the larger will be therefore the size of the device.

The values of the aforesaid geometrical parameters chosen in a preferred example of construction of the device are given here below, although these values are purely indicative and can be widely changed depending on the requirements dictated each time by the specific application.

A 0.3-m value has been chosen as the height of the device to enable the patient to place his foot on the movable platform while sitting on a normal seat. The maximum travel of the linear actuators has been chosen to be equal to 0.1 m, the length of the legs ranging therefore between 0.277 m and 0.377 m with a mean value of 0.327 m. With such a travel value, the widest working space (locus of the combinations of angles α and β which can be obtained with the rehabilitation device) results from a radius of the movable platform which is smaller than the radius of the support base. In particular, a 0.085-m value and a 0.125-m value have been chosen, respectively, for the radius of the movable platform and for the radius of the support base. As far as the design of the electric motor and reduction gear unit of each linear actuator is concerned, it has been ascertained that the maximum force which must be produced by each actuator to make it possible for the rehabilitation device to carry out all the exercises required in the various phases of the rehabilitation protocol is equal to 636.5 N. Since the maximum travel of the linear actuators must be obtained with a rotation of the driving pulley in the order of 1.5 turns at most, in order to prevent the flexible cable from coming out of the respective groove on the driving pulley, the radius of the driving pulley has been set to be equal to 0.01 m. The torque deliverable by the electric motor and reduction gear unit of each linear actuator to obtain the aforesaid maximum force value with a driving pulley having the aforesaid diameter is therefore equal to 6.365 Nm. A direct current brush electric motor produced by Maxon (RE40 mod.) associated to an epicycloidal reduction gear with a 12:1 reduction ratio has been chosen to obtain that torque value. Finally, as far as the flexible cable of the linear actuators is concerned, a 7×19 1.5-mm diameter multi-strand steel cable has been chosen, which is able to bear a maximum load of 1.500 N.

Naturally, the principle of the invention remaining unchanged, the embodiments and manufacturing details may be widely varied with respect to those described and illustrated purely by way of non-limiting example.

The invention claimed is:

1. A linear actuator comprising:

a body, an output member slidably received in the body along a first axis, a motor unit for producing a rotary motion about a second axis, and a motion conversion mechanism for converting the rotary motion produced by the motor unit about the second axis into a translational motion of the output member along said first axis, wherein the motion conversion mechanism includes a driving pulley arranged to be set into rotation by the motor unit about the second axis and an elongated mechanical transmission member wound onto the driving pulley, at the elongated mechanical transmission member having two opposite ends fastened to the output member to draw the output member in either direction along the first axis as a result of the rotation of the driving pulley in either direction, wherein the output member is shaped as a rod and is received in a cylindrical cavity of the body so as to project partially therefrom, and wherein the elongated mechanical transmission member is fastened to the output member at axially opposite points of the output member with respect to the driving pulley.

2. A linear actuator according to claim 1, wherein the second axis is oriented parallel to the first axis and wherein the motion conversion mechanism further comprises a pair of guide pulleys interposed between the driving pulley and the output member to deviate each the direction of a respective length of the elongated mechanical transmission member from transverse to axial.

3. A linear actuator according to claim 2, wherein the guide pulleys are inclined to each other so as to converge towards the output member.

4. A linear actuator according to claim 1, wherein the output member has, on the side facing the driving pulley, a flat surface which extends throughout the output member and on which there are provided, at axially opposite ends of the output member, respective notches in which respective end members for fastening the two opposite ends of the elongated mechanical transmission member are received.

5. A linear actuator according to claim 1, wherein the motor unit comprises an electric motor and a motor shaft on which the driving pulley is mounted so as to be drivingly connected for rotation with the motor shaft.

6. A linear actuator according to claim 5, wherein the motor unit further comprises a reduction gear interposed between the electric motor and the motor shaft.

7. A linear actuator according to claim 1, further comprising a position sensor for providing a signal indicative of a linear position of the output member.

8. A linear actuator according to claim 7, wherein the position sensor is an angular position sensor for detecting an angular position of the driving pulley.

9. A linear actuator according to claim 1, further comprising a load cell placed at an end of the output member to provide a signal indicative of an axial force produced by the actuator.

10. Parallel kinematic rehabilitation device, comprising a support base, a movable platform, a central strut fixed at a bottom end to the support base and is connected at a top end to the movable platform to allow the movable platform to rotate at least about two perpendicular axes, and three linear actuators according to claim 1, which are interposed between the support base and the movable platform to control the movement of the movable platform.

* * * * *